United States Patent [19]

Shinbori

[11] Patent Number: 4,905,552
[45] Date of Patent: Mar. 6, 1990

[54] ROTARY PIPE CUTTING APPARATUS

[75] Inventor: Shojiro Shinbori, Chigasaki, Japan

[73] Assignee: Shinko Kikai Kabushiki Kaisha, Chigasaki, Japan

[21] Appl. No.: 201,475

[22] Filed: Jun. 1, 1988

[30] Foreign Application Priority Data

Jun. 3, 1987 [JP] Japan .................. 62-85766[U]

[51] Int. Cl.⁴ ............................................. B23B 5/14
[52] U.S. Cl. ........................................ 82/46; 82/59; 82/56
[58] Field of Search ............... 82/46, 47, 48, 59, 61, 82/65, 70.1, 98, 54, 56, 58, 67, 68, 4 C

[56] References Cited

U.S. PATENT DOCUMENTS 3,848,489 11/1974 Santana .................. 82/61
4,430,913 2/1984 Williamson ............ 82/59
4,655,109 4/1987 Rungger et al. ........ 82/61
4,671,148 6/1987 Thatcher ................. 82/65

FOREIGN PATENT DOCUMENTS 51-39717 7/1976 Japan.

*Primary Examiner*—Frederick R. Schmidt
*Assistant Examiner*—Lawrence Cruz
*Attorney, Agent, or Firm*—Ladas & Parry

[57] ABSTRACT

The pipe rotary cutting device of this invention comprises shifter means which is operative to rotate a cylindrical body relative to a main shaft to thereby rotate an internal gear secured to the cylindrical shaft. The rotation of the internal gear rotates pinion gears secured to the main shaft to thereby rotate eccentric shafts provided coaxially with the pinion gears. Then the rotation of the eccentric shafts is converted by sliders into radial movements. A cutting tool as well as disc cutters are provided on the sliders respectively through a cutting tool holder and cutter holders. The pipe rotary cutting device of such arrangement enables the steps of chamfering and cutting to be carried out simultaneously, and accordingly the chamfering step of removing the outward burrs created in cutting a pipe is totally unnecessary.

5 Claims, 2 Drawing Sheets

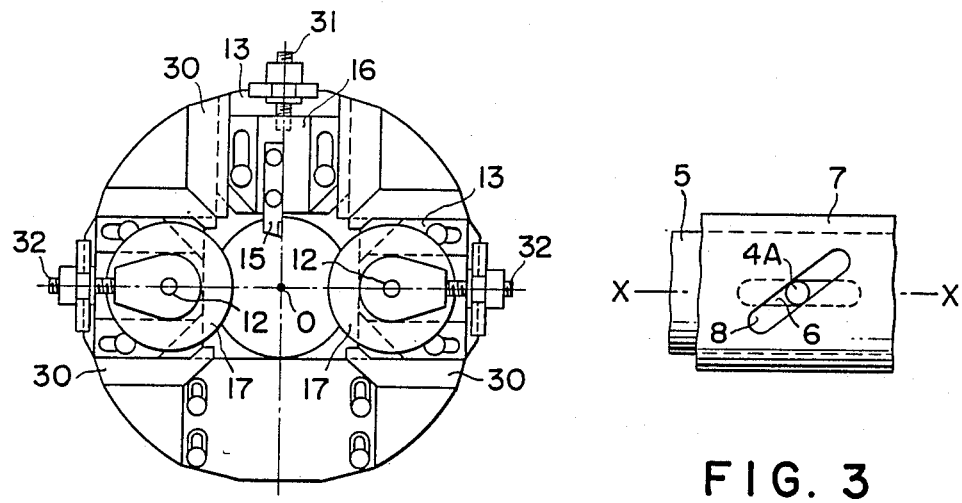
FIG. 2
FIG. 3
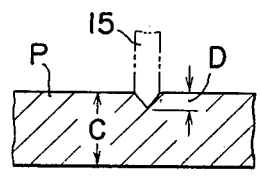
FIG. 4 (a)
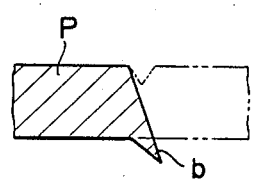
FIG. 4 (b)
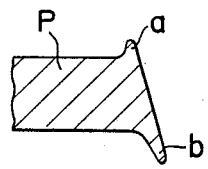
FIG. 5

4,905,552

ROTARY PIPE CUTTING APPARATUS

BACKGROUND OF THE INVENTION

This invention relates to a rotary cutting device suitable to cut pipes, specifically to a pipe rotary cutting device which is capable of preventing the occurrences of outside burrs at the end of the pipe upon cutting pipes.

In the conventional pipe cutting devices, a pipe is held at several points longitudinally spaced at a suitable interval, and while the pipe is being rotated, a sawing plate, a disc cutter or others are pressed against the pipe on one side thereof to cut the pipe. In addition, as described in Japanese Patent Publication No. 39717/1976, a pipe is held at the outside circumference thereof, and disc cutters are pressed against the pipe from the outside in three directions and are advanced radially by the thickness of the pipe and cut the pipe.

But in cutting the pipe by these conventional cutting devices, especially using a disc cutter, as shown in FIG. 5, both outward burr (a) and inward burr (b) tend to be created at the end of the pipe (p). The pipe having such burrs is not usable as it is, and the burrs have to be removed before the pipe is put to use.

So far there has been no effective preventive means for the inward burrs. Practically the pipe having such burrs is put to use after its pipe end is chamfered by correcting means. The removal of the outward burrs requires an extra step of chamfering, which increases a number of steps. Resultantly the pipe cutting of this type tends to be accompanied by additional costs.

SUMMARY OF THE INVENTION

In view of the above-described drawback of the prior art, this invention aims to provide a pipe rotary cutting device which makes a minor change of the conventional device but involves a drastic improvement which prohibits the occurrences of outward burrs upon cutting a pipe.

In order to achieve the object described above, the pipe rotary cutting device comprises roller pins, shifter means for moving the roller pins in the axial direction, a main shaft having slots for the roller pins to be inserted into formed therein in the axial direction, and a cylindrical body having slots for the roller pins to be inserted into formed therein diagonally to the axial direction and disposed around the outside of the main shaft rotatably relative thereto. Further, there are provided an internal gear secured to one end of the cylindrical body, at least two pinion gears to mesh with the internal gear, gear shafts pivotally connected to one end of the main shaft and having one end securing the pinion gears and the other end formed in eccentric shafts, sliders disposed with the eccentric shafts therebetween slidably to the axial center, a cutting tool disposed on one of the sliders through a cutting tool holder, and disc cutters disposed on the other ones of the sliders through cutter holders. The pipe rotary cutting device of this invention further comprises a frame to which are pivotally connected the other end of the main shaft, the other end of the cylindrical body and the shifter means, and a hollow shaft inserted in the main shaft for receiving a material to be cut, such as a pipe. When the shifter means is operated to move the roller pins in the axial direction, the movement of the roller pins causes the cylindrical body to rotate relative to the main shaft, and consequently the internal gear rotating the pinion gears, replacing the eccentric shafts to the axial center.

The arrangement of this invention that the roller pins are engaged in the slots of the cylindrical body and in the slots of the main shaft enables the roller pins to rotate the main shaft and the cylindrical body to rotate integrally with each other when the cylindrical body, for example, is rotated.

At this time, the internal gear secured to one end of the cylindrical body and at least the two pinion gears in mesh with the internal gear do not rotate relative to each other. Consequently, the eccentric shafts on the other end of the gear shafts of the pinion gears, the sliders slidable with the eccentric shaft therebetween, and the cutting tool and the sliders provided on the respective sliders through the respective holders rotate without being replaced.

When the shifter means is operated to move the roller pins, the roller pins are allowed to move in the axial direction within the slots of the main shaft, which are axially formed, but within the slots of the cylindrical shafts which are formed diagonally to the axial line the roller pins have to force the cylindrical body to rotate, and consequently the cylindrical body is rotated relative to the main shaft.

Consequently, the internal gear secured to the cylindrical body, and the pinion gears pivotally connected to the main shaft are relatively rotated in mesh with each other.

Resultantly by the rotation of the eccentric shafts the sliders slide toward the axial center, and consequently the cutting tool and disc cutters disposed on the respective sliders move toward the axial center.

Therefore a pipe to be cut is loaded in the hollow shaft of the main shaft. Then, the cutting tool incises a part of the thickness of the pipe, and the disc cutters follow the incision to complete the cut. This enables a pipe to be cut with an inward burr but without an outward burr.

An embodiment of this invention will be described with reference to the drawings attached hereto.

BRIEF DESCRIPTION OF THE DRAWINGS

In the accompanying drawings:

FIG. 2 is a front view of FIG. 1;

FIG. 3 is a plan view of FIG. 1 as viewed in the direction of the arrow Z;

FIG. 4 is views showing the process of cutting a pipe in which FIG. 4(a) is a view showing a condition where the cutting tool is incising and FIG. 4(b) is a view showing a condition where an incision by the disc cutters following an incision by the cutting tool is completed; and FIG. 5 is a view showing the contour of a cut end of a cut pipe.

DESCRIPTION OF THE PREFERRED EMBODIMENT

Figure 1:
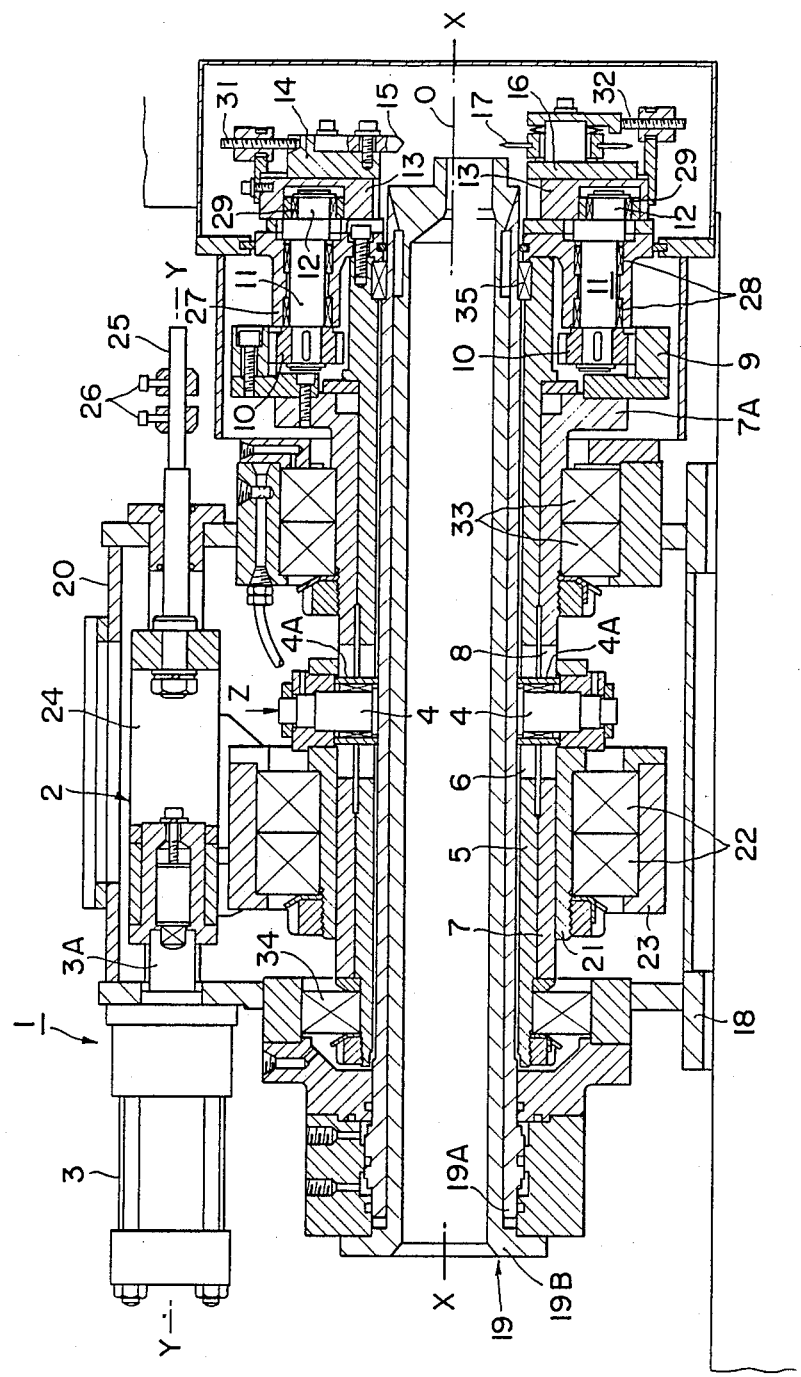
FIG. 1 is a sectional view of one embodiment of the pipe rotary cutting device according to this invention.

In FIG. 1, the pipe rotary cutting device according to this invention comprises a pair of roller pins 4, shifter means 1 having a sliding portion 2 and a drive means or driver 3 for driving the sliding portion 2, a main shaft 5 having slots 6 for the roller pin 4 to be inserted into, and a cylindrical body 7 having slots 8 for the roller pins 4 to be inserted into and disposed around the outside of the main shaft 5. The pipe rotary cutting device further comprises an internal gear 9 secured to one end of the cylindrical body 7, at least two pinion gears 9 to mesh with the internal gear 10, gear shafts 11 pivotally connected to one end of the main shaft 5 and each having one end provided with one of the pinion gears 10 and the other end formed in an eccentric shaft 12, sliders 13 provided between the eccentric shafts 12 slidably toward the axial center (0), a cutting tool 15 provided on one of the sliders 13 through a cutting tool holder 14, disc cutters 17 provided on the remaining sliders 13 through cutter holders 16, a frame 18 to which one end of the cylindrical body 7 and the other end of the main shaft 5 are pivotally connected and to which the shifter means 1 is secured; as well as a hollow shaft 19 in which a pipe to be cut is loaded.

The shifter means 1, as described above, comprises the sliding portion 2 and drive means 3. The drive means 3 is fixed to guide means 20 secured to the frame 18 so that a rod 3A of the drive means 3 is movable in the direction of an axial line Y—Y parallel with the axial line X—X.

The sliding portion 2 comprises an annular body 21 disposed around the outside of the cylindrical body 7, a bearing 22, a bearing guide 23 and a support member 24. The bearing guide 23 is secured to the support member 24. The bearing 22 is interposed between the bearing guide 23 and the annular body 21 so as to support the annular body 21 rotatably.

The annular body 21 has the pair of roller pins 4 provided on one longitudinal end thereof, opposed diametrically to each other, and directed perpendicularly toward the axial center 0. Rollers 4A are provided on the portions of the respective roller pins 4 to engage into the slots 6, 8 of the main shaft 5 and the cylindrical body 7.

The support member 24 is secured to the tip of the rod 3a of the drive means 3. The support member 14 is moved axially following an advance and a withdrawal of the rod 3A. The annular body 21 interconnected with the support member 24 is movable over the cylindrical body 7 in the direction of the axial line X—X parallel with the direction of movement of the support member 24.

A position detecting rod 25 is provided on the support member 24 suitably spaced from the rod 3A and is made movable in the direction of the axial line of Y—Y accompanying a movement of the rod 3A. Limit switches 26 are provided on the position detecting rod 25 for detecting a starting position and a finish position of a movement of the support member 24. The main shaft 5 is formed in a substantially cylindrical shape and has the slots 6 formed in the intermediate portion thereof in the direction of the axial line X—X and diametrically opposite to each other. The roller portions 4A of the roller pins 4 are engaged in the respective slots 6 movably within the slots 6 in the direction of the axial line X—X.

The cylindrical body 7 as well as the main shaft 5 are formed in a substantially cylindrical shape and has the slots 8 formed in the intermediate portion thereof diagonally to the axial line X—X and diametrically opposite to each other. The roller portions 4A of the roller pins 4 are engaged in the slots 8 movably within the slots 8.

This arrangement permits the main shaft 5 and the cylindrical body 7 to rotate integrally with each other unless the roller portions 4A of the roller pins 4 roll even when the roller portions 4A are engaged in the slots 6, 8. When the roller portions 4A roll, i.e., when the annular body 21 is moved, the cylindrical body 7 is rotated relative to the main shaft 5.

The cylindrical body 7 has rotation transmitting means, e.g., a sleeve, not shown so as to be rotated through the means. One end of the cylindrical body 7 is formed in a conical increased-diameter flange 7A. The internal gear 9 is secured to the flange 7A by means of fastening means, e.g., bolts.

Bearing support members 27 are secured to one end of the main shaft 5 referred to above. The bearing support members 27 support rotatably through bearings 28, 28 the gear shafts 11, which have one end securing the pinion gears 10 to mesh with the internal gear 9 and the other end formed in the eccentric shafts 11.

At least two (three in this embodiment) sliders 13 are mounted on the eccentric shafts 12 through the slide holders 30 each with one of the eccentric shafts 13 interposed therebetween and slidably toward the axial center 0 through rollers 29. One of the sliders 13 is provided with the cutting tool 15 through the cutting tool holder 14. The other slides 13 (two in this embodiment) are provided with the disc cutters 17 through the cutter holders 16.

The feed amounts of the cutting tool 15 and disc cutters 17 are adjusted by fine adjustment screws 31, 32 disposed near them.

In this embodiment, the depth of the incisions made by the cutting tool 15 is 0.5-1.0 mm. The disc cutters 17 are behind the incision of the cutting tool by about 130 degrees in entering the incisions.

On the frame 18 there are provided bearings 33, 34 for pivotally supporting one end of the cylindrical member 7 and the other end portion of the main shaft 5. The hollow shaft 19, which has a double structure, is inserted in the main shaft 5 through a bearing 35. The outer hollow shaft 19A of the double structure is formed as a piston for a collet attachment, and the inner hollow shaft 19B thereof is formed as a chuck for the collet attachment. This arrangement enables a pipe to be cut to be clamped at one end thereof by one end of the hollow shaft 19, so that the pipe can be easily cut.

Next the operation of the pipe rotary cutting device of this invention will be explained.

First, the cylindrical body 7 is rotated by a drive motor not shown without a pipe P loaded in the hollow shaft 19. The rollers 4A are engaged in the slots 6 of the main shaft 5 as well as in the slots 8 of the cylindrical body 7, and the roller pins 4, which are the basic portions of the rollers 4A, are fastened to the annular body 21.

According, the cylindrical body 7 and the main shaft 5 rotate together with the annular body 21 being interconnected through the bearing 22 installed in the bearing guide 23. The support member 24 supports the bearing guide 23 by means of arm connection (as shown in FIG. 1) therebetween.

Accordingly the internal gear 9 secured to the cylindrical body 7, and at least the two pinion gears do not rotate relative to each other but rotate together with each other in mesh with each other. Further, the eccentric shaft 12 disposed at the other ends of the gear shafts 11 of the pinion gears 10, the sliders 13 slidable toward and from the axial center 0, the cutting tool 15 mounted on one of the sliders 13 through the cutting tool holder 14, and the disc cutters 17 mounted on the outer sliders 13 through the cutter holders 16 are rotated without any replacement thereof.

Under these conditions, in order to start a pipe cutting operation, the drive means 3 of the shifter means 1 is operated to move the sliding portion 2 of the shifter means 1 in the direction of the axial line Y—Y. Then the annular body 21 interconnected through the bearing 22 with the bearing guide 23, which is secured to the support member 24 of the sliding portion 2 is moved even on rotation in the direction of the axial line X—X parallel with the axial line Y—Y, and accordingly the roller pins 4 in the annular body 21 are also moved together.

Under the conditions, the roller pins 4A of the rollers 4 inserted in the slots 6 formed in the main shaft 5 in the direction of the axial line X—X and in the slots 8 formed in the cylindrical body 7 diagonally to the axial line X—X are moved within the slots 6 of the main shaft 5 in the axial direction thereof but cannot move within the slots 8 of the cylindrical body 7 axially thereof since the slots 8 are formed diagonally of the axial line thereof as shown in FIG. 3. In order to allow the roller pins 4 to further advance, the cylindrical body 7 has to be rotated relative to the main shaft 5. Resultantly the cylindrical body 7 and the main shaft 5 are rotated relative to each other.

Further resultantly the internal gear 9 secured to the cylindrical body 7 and the pinion gears pivotally supported by the bearing support member 27 on the side of the main shaft 5 are rotated in mesh with each other.

As a result the rotation of the eccentric shafts 13 causes the sliders 13 to slide toward the axial center 0 to oppose to each other. Firstly the cutting tool 15 disposed on one of the slider 13 is moved toward the axial center 0, and then next the disc cutters 17 are moved toward the axial center. At this time, the cutting tool 15 and the disc cutters 17 are at their most remote positions from the axial center 0 in which they are about to start a cutting operation.

With the pipe rotary cutting device set in this condition, the pipe P is inserted into the hollow shaft 19. Then the pipe P is clamped by the inner and outer hollow shafts 19A, 19B with a portion thereof to be cut opposed to the cutting tool 15 and the disc cutters 17. Then the shifter means 1 is operated to move the cutting tool 15 toward the axial center 0 to make a shallow incision D (e.g., of a 0.5-1.0 mm depth) partially in a thickness C of the pipe P as shown in FIG. 4(a). Following the incisions of the cutting tool 15, the disc cutters 17 are rotated to align with the incisions and then are advanced with a delay of 130 degrees to complete the incisions. Then the pipe P is cut in the end configuration as shown in FIG. 4(b).

The number of the disc cutters 17 may be one pair of disc cutters or more than two pairs depending on thicknesses or diameters of pipes to be cut.

As described above, in this invention the cylindrical body is rotated relative to the main shaft by the operation of the shifter means, and the internal gear secured to the cylindrical body is rotated to revolve the pinion gears mounted on the main shaft and besides to revolve the eccentric shafts provided coaxially with the pinion gears. The rotation of the eccentric shafts is converted by the sliders into the radial movement. The cutting tool and the disc cutters are provided on the sliders through the cutting tool holders and the cutter holders, respectively. This arrangement enables a removal of outside burrs and a cutting operation to be carried out simultaneously. As required in the conventional art, the pipe rotary cutting device of this invention totally dispenses with the step of removing outside burrs formed in the cutting step. This produces an advantage that the cutting operation can be done easily without wasteful powers.

What is claimed is:

1. A pipe rotary cutting device comprising:
    roller pins;
    shifter means for moving said roller pins in an axial direction of said cutting device;
    a main shaft having slots formed therein in the axial direction so as to receive said roller pins, said main shaft having a first and second end;
    a cylindrical body disposed around the outside of said main shaft, having slots formed therein which are diagonal to the axial direction so as to receive said roller pins, said cylindrical body having a first and second end;
    an internal gear secured to said second end of said cylindrical body;
    at least two pinions to mesh with said internal gear;
    gear shafts having one end securing each pinion gear and the other end formed in eccentric shafts;
    sliders engaging said eccentric shafts so as to be slidable towards the axial center;
    a cutting tool holder disposed on one of said sliders having a cutting tool;
    cutter holders disposed on the remaining sliders having disc cutters;
    a frame pivotally connected to the first end of said main shaft, the first end of said cylindrical body and to said shifter means; and
    a hollow shaft inserted in said main shaft for receiving a material to be cut, said shaft having a first and second end.

2. The pipe rotary cutting device according to claim 1, wherein said shifter means comprises a sliding portion and a driver for driving said sliding portion; and said driver is secured to a guide means on said frame in such a manner that a rod of said driver is movable in the axial direction.

3. The pipe rotary cutting device according to claim 1, wherein fine adjustment screws are provided on said cutting tool holder and said cutter holder for adjusting the feed amount of said cutting tool and said disc cutters.

4. The pipe rotary cutting device according to claim 1, wherein said hollow shaft includes an outer hollow shaft overlying the inner hollow shaft, the inner hollow shaft is connected to a collet attachment having a chuck portion for clamping the material to be cut, and wherein the outer shaft is axially movable so as to press the chuck portion of the collet attachment against the pipe to be cut.

5. The pipe rotary cutting device according to claim 2, wherein a support member is secured to the tip of the rod of said driver; a position detecting rod is provided on said support member; and a limit switch is provided on said position detecting rod for detecting the start and the end of a movement of said shifter means.

* * * * *